US011451152B2

(12) United States Patent
Odell (10) Patent No.: US 11,451,152 B2
(45) Date of Patent: *Sep. 20, 2022

(54) ACTIVE CLAMP CIRCUIT WITH STEERING NETWORK

(71) Applicant: Power Integrations, Inc., San Jose, CA (US)

(72) Inventor: Arthur B. Odell, Morgan Hill, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,347

(22) Filed: Feb. 22, 2021

(65) Prior Publication Data

US 2021/0175810 A1 Jun. 10, 2021

Related U.S. Application Data

(63) Continuation of application No. 16/685,463, filed on Nov. 15, 2019, now Pat. No. 10,965,218.

(51) Int. Cl.
*H02M 3/335* (2006.01)
*H02M 1/34* (2007.01)
(52) U.S. Cl.
CPC ........ *H02M 3/33507* (2013.01); *H02M 1/34* (2013.01)
(58) Field of Classification Search
CPC .... H02M 3/33507; H02M 1/34; H02M 3/335; H02M 5/42; H02M 3/33592; H02M 1/08; H02M 2001/0058
See application file for complete search history.

(56) References Cited

U.S. PATENT DOCUMENTS

| 5,402,329 A | 3/1995 | Wittenbreder |
| 5,602,724 A | 2/1997 | Balakrishnan |

(Continued)

FOREIGN PATENT DOCUMENTS

| CN | 103795260 B | 1/2016 |
| WO | 2017095408 A1 | 6/2017 |

OTHER PUBLICATIONS

Alou, et al., "Flyback with Active Clamp: a suitable topoly for Low Power and Very Wide Input Voltage Range Applications", 2002, IEEE, pp. 242-248.
Dalal, Dhaval, "Design Considerations for Active Clamp and Reset Technique", Unitrode Seminar Paper, 24 pages.
Jailyn, et al., "Analysis of Active Clamp Fly Back Converter", Modern Applied Science, vol. 9 No. 1, 2015, pp. 12-24, Canadian Center of Science and Education.

(Continued)

*Primary Examiner* — Kyle J Moody
*Assistant Examiner* — Lakaisha Jackson
(74) *Attorney, Agent, or Firm* — Power Integrations, Inc.; Karina Martha G. Li (57) ABSTRACT

A power converter, comprising an energy transfer element, an output of the power converter, a power switch, an active clamp circuit, and a first controller. The active clamp circuit comprising a capacitance, a steering diode network coupled to the capacitance and configured to transfer a charge to the capacitance, a clamp switch coupled to the capacitance and configured to transfer the charge stored in the capacitance to the energy transfer element, and an offset element coupled to the clamp switch and configured to provide a path to discharge a capacitance associated with the clamp switch. The first controller configured to output a clamp drive signal to control the turn on and turn off of the clamp switch and a primary drive signal to control the turn on and turn off of the power switch.

21 Claims, 6 Drawing Sheets

(56) References Cited

U.S. PATENT DOCUMENTS

| | | | |
|---|---|---|---|
| 6,144,564 A | 11/2000 | Fraidlin et al. | |
| 6,496,392 B2* | 12/2002 | Odell | H02M 3/335 |
| | | | 363/56.11 |
| 8,400,789 B2 | 3/2013 | Joshi | |
| 8,451,630 B2 | 5/2013 | Nania et al. | |
| 9,973,098 B2 | 5/2018 | Phadke et al. | |
| 10,186,976 B2 | 1/2019 | Duvnjak | |
| 10,291,136 B2 | 5/2019 | Song et al. | |
| 2010/0067259 A1 | 3/2010 | Liu | |
| 2010/0284204 A1 | 11/2010 | Mayell | |
| 2011/0305048 A1 | 12/2011 | Yang et al. | |
| 2015/0003121 A1 | 1/2015 | Yang et al. | |
| 2017/0070152 A1 | 3/2017 | Liu | |
| 2017/0264206 A1 | 9/2017 | Rana et al. | |
| 2018/0006015 A1* | 1/2018 | Rutter | H01L 29/0626 |
| 2018/0309442 A1 | 10/2018 | Siebler | |
| 2018/0358902 A1* | 12/2018 | Duvnjak | H02M 3/33592 |
| 2019/0341859 A1* | 11/2019 | Cohen | H02M 1/34 |

OTHER PUBLICATIONS

King, et al., "Incorporating Active-Clamp Technology to MAximuze Efficiency in Flyback and Forward Designs", 2010 Texas Instruments Power Supply Design Seminar, SEM1900 Topic 2, SLUP262, 2010, 26 pages.

Song, et al., "Comparison between Control Methods of Active Clamp Flybackfor Adaptor Application," 2018 IEEE International Power Electronics and Application Conference and Exposition (PEAC), Shenzhen, China, 2018, pp. 1-6.

Watson, Robert, "Characterization of an Active Clamp Flyback Topology for Power Factor Correction Applications", IEEE Transactions on Power Electronics, vol. 11 No. 1, Jan. 1996, pp. 191-198.

Zhang, Junming, "A High Efficiency Flyback Converter with New Active Clamp Technique", IEEE Transactions on Power Electronics, vol. 25 No. 7, Jul. 2010, pp. 1775-1785.

\* cited by examiner

ACTIVE CLAMP CIRCUIT WITH STEERING NETWORK

CROSS-REFERENCE TO RELATED APPLICATIONS

This application is a continuation of U.S. application Ser. No. 16/685,463, filed Nov. 15, 2019, currently pending. U.S. application Ser. No. 16/685,463 which is incorporated in its entirety herein by reference.

BACKGROUND OF THE INVENTION

Field of the Invention

The present invention relates generally to switched mode power converters, and more specifically to clamps for an energy transfer element of a switched mode power converter.

Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Switched mode power converters may include a clamp circuit coupled across a primary winding of the energy transfer element to prevent damage to the switch. Generally the clamp circuit includes passive components, such as diodes, resistors or capacitors. In general, a passive component may store or maintain energy in the form of voltage or current. An active component may produce energy in the form of a voltage or current. One example of an active component may be a transistor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Clamp circuits may be used to prevent damage to components of the power converter. Clamp circuits are typically coupled across the primary winding of an energy transfer element of a power converter and may limit the amount of voltage across the primary winding when the power switch of the power converter is OFF. The clamp circuit generally includes passive components but may also include active components, such as a transistor, to control when the clamp circuit is enabled. A clamp circuit that uses an active component, such as a transistor, may be referred to as an active clamp circuit.

Active clamp circuits may also be used to reduce losses experienced by the power converter. A power converter generally experiences two types of losses: conduction loss and switching loss. Conduction losses and switching losses occur due to the electrical resistance in the circuit and the parasitic capacitance that is switched by the power converter, particularly when the power switch is a transistor. When the power switch conducts current, the resistance of the circuit along with the current passing in the circuit generates conduction loss. Switching losses are generally associated with the losses which occur while the power switch of the power converter is transitioning between an ON state to an OFF state or vice versa. In one example, a switch that is ON (or closed) may conduct current while a switch that is OFF (or open) cannot conduct current. When the power switch is open, voltage across the switch stores energy in the parasitic capacitance. The parasitic capacitance discharges when the power switch closes, dissipating the energy stored in the parasitic capacitance in the resistance of the power switch to produce switching loss.

Further, switching losses may result from having a non-zero voltage across the power switch at the moment the power switch turns ON or from having a non-zero current through the power switch when the power switch turns OFF. An active clamp circuit may be used to reduce the switching losses through the use of zero voltage switching techniques. Similar to a passive clamp circuit, an active clamp circuit is coupled across the primary winding of the energy transfer element of a power converter and includes a switch (such as a transistor) to enable current flow through the active clamp circuit. The switch for the active clamp circuit may be referred to as a clamp switch. Typical active clamp circuits enable current flow through the active clamp for the entirety of the OFF time of the power switch. The active clamp circuit facilitates the discharge of the parasitic capacitance associated with the power switch and the voltage across the power switch falls to substantially zero prior to the power switch turning ON and as such switching losses may be reduced.

One topology for a switched mode power converter is known as a flyback converter. The flyback converter can provide low output currents at low component cost and is relatively simple in comparison to other converter topologies. The flyback converter may also utilize an active clamp circuit to prevent excess voltage from damaging components within the flyback converter. However, flyback converters may be limited at higher output power ranges and use at higher switching frequencies due to leakage inductance related losses and switching losses. An active clamp circuit may also be used with a flyback converter, however, typical active clamp circuits where the clamp switch is ON when the power switch of the power converter is OFF could result in current ringing and an increase in the RMS current. The current ringing and increased RMS current generally translates to a larger output capacitor used for the flyback converter, which would increase cost for the power converter.

Transistors, such as n-type metal-oxide semiconductor field effect transistors (MOSFETs) or GaN based heterojunction field effect transistors (HFETs), can be used as the clamp switch for the active clamp circuit. MOSFETs typically include a body diode, also referred to as an anti-parallel diode. The body diode of the clamp switch may be characterized by its reverse recovery time, which is the amount of time it takes for the body diode to block reverse current. A "fast" body diode may have reverse recovery times with 50 nanoseconds (ns) to 150 ns. A "slow" body diode may have reverse recovery times over 1 microsecond (µs). When the clamp switch includes a MOSFET with a slow body diode, ringing may occur at the drain terminal of the power switch. The clamp switch could also include a GaN cascode FET. However, the GaN cascode FET may have a large output capacitance (Coss) which may also cause ringing when the clamp switch turns off.

Embodiments of the present disclosure include an active clamp circuit with a steering diode network. The active clamp circuit includes a clamp switch, clamp capacitance, steering diodes, and an offset element. In embodiments, the clamp switch is controlled such that current flows through the active clamp circuit during portions off the OFF time of the power switch. In addition, the current through the active clamp circuit is substantially zero during portions of the OFF time of the power switch. Further, the clamp switch is not turned ON until near the end of the OFF time of the power switch. At or near the beginning of the OFF time of the power switch, the steering diodes of the active clamp circuit conducts a charge associated with the leakage inductance of the power converter. The steering diodes transfer the charge associate with the leakage inductance to the clamp capacitance and stored. The steering diodes stop conducting when the net charge associated with the leakage inductance is transferred. The steering diodes also prevents the charge associated with the leakage inductance from conducting through the body diode (or anti-parallel diode) of the clamp switch.

The active clamp circuit also includes an offset element, such as a Zener diode or a resistance, which is utilized to control the voltage across the clamp switch when the power switch is OFF. In other words, the offset element may be used to control the voltage across the clamp switch such that the clamp switch voltage is minimal during the off-time of the main power switch as compared to the voltage across the clamp switch if the active clamp circuit does not include an offset element. The offset element allows to reduce the voltage across the clamp switch to thereby reduce switching losses associated with the clamp switch while preventing the body diode of the clamp switch from conducting.

In embodiments, the clamp switch is turned ON for a first duration near an end of an off-time of the power switch to inject charge stored in the active clamp circuit, specifically the clamp capacitance, into the energy transfer element to discharge the parasitic capacitance of the power switch into the energy transfer element before the power switch is turned ON. The clamp switch and the power switch may be controlled by a first controller which includes a clamp control which controls the turn on and turn off of the clamp switch and a regulation control to turn on and turn off the power switch. The regulation control is configured to receive a request signal representative of a request to turn on the power switch. In response to the request signal, the regulation control provides an enable signal to the clamp control to enable the clamp switch to turn on. In response to the enable signal, the clamp control outputs a clamp drive signal to turn on the clamp switch. The clamp drive signal is also received by the regulation control. Once the clamp switch is turned off, the regulation control turns on the power switch.

Figure 1:
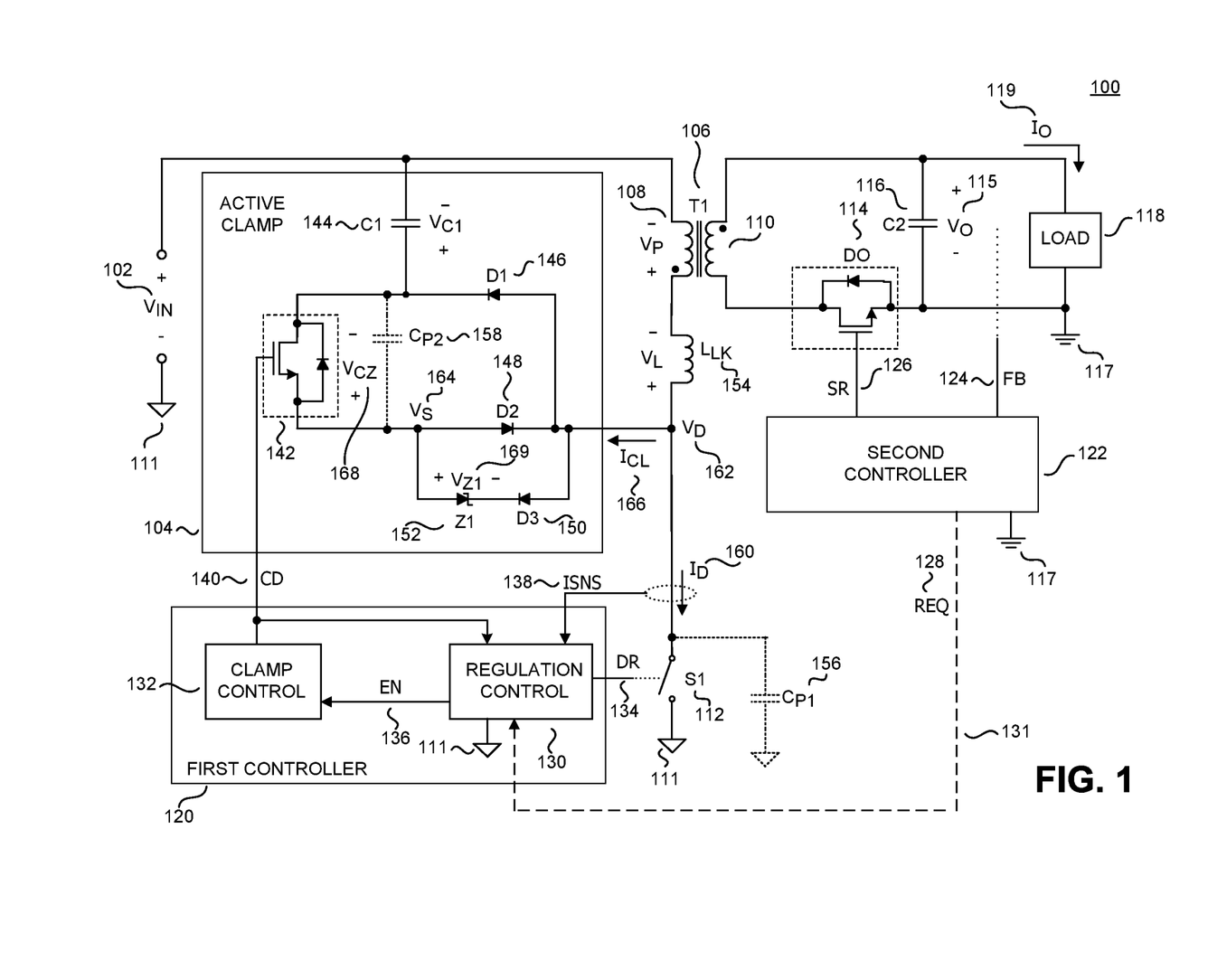
FIG. 1 is a diagram illustrating an example power converter with first and second controllers for controlling an active clamp circuit, in accordance with an embodiment of the present disclosure.

To illustrate, FIG. 1 shows a diagram of an example power converter 100 is including an example active clamp circuit 104 and a first controller 120 and a second controller 122 in accordance with the teachings of the present disclosure. The illustrated example of the power converter 100 includes an energy transfer element 106, a primary winding 108 of the energy transfer element 106, a secondary winding 110 of the energy transfer element 106, a power switch S1 112, an input return 111, an active clamp circuit 104, an output rectifier DO 114 an output capacitor C2 116, an output return 117, a second controller 122, and a first controller 120. The active clamp circuit 104 is shown as including a clamp capacitance C1 144, a clamp switch 142 (represented as a transistor with an associated anti-parallel diode), steering diodes D1 146 and D2 148, offset element Z1 152, and diode D3. First controller 150 is shown as including a regulation control circuit 130 and a clamp control circuit 132. Further illustrated is an uncoupled inductor $L_{LK}$ 154, which may represent the leakage inductance associated with the energy transfer element 106 or a discrete inductor. In dashed lines, a capacitance $C_{P1}$ 156 is shown to represent all the capacitance that couples to the power switch S1 112 and may include natural capacitance internal to the energy transfer element 106, the natural internal capacitance of power switch S1 112 and/or discrete capacitors. Also shown in dashed lines is a capacitance $C_{P2}$ 158 to represent all the capacitance that couples to the clamp switch 142. Also shown in FIG. 1 are an input voltage $V_{IN}$ 102, an output voltage $V_O$ 115, an output current $I_O$ 119, a feedback signal FB 124, a request signal REQ 128, a current sense signal ISNS 138, a switch current $I_D$ 160, a primary drive signal DR 134, an enable signal EN 136, a clamp drive signal CD 140, a power switch voltage $V_D$ 162, a primary voltage $V_P$, a leakage voltage $V_L$, a source voltage $V_S$ 164, a clamp switch voltage $V_{CZ}$ 168, a clamp capacitance voltage $V_{C1}$ and a clamp current $I_{CL}$ 166. In the illustrated example, the power converter 100 is shown as having a flyback topology. Further, the input of power converter 100 is galvanically isolated from the output of power converter 100, such that input return 111 is galvanically isolated from output return 117. Since the input and output of power converter 100 are galvanically isolated, there is no direct current (dc) path across the isolation barrier of energy transfer element T1 106, or between primary winding 108 and secondary winding 110, or between input return 111 and output return 117. It is appreciated that other known topologies and configurations of power converters may also benefit from the teachings of the present disclosure.

The power converter 100 provides output power to a load 118 from an unregulated input $V_{IN}$ 102. In one embodiment, the input $V_{IN}$ 102 is a rectified and filtered ac line voltage. In another embodiment, the input voltage $V_{IN}$ 102 is a dc input voltage. The input $V_{IN}$ 102 is coupled to the energy transfer element 106. In some embodiments, the energy transfer element 106 may be a coupled inductor, transformer, or an inductor. The example energy transfer element 106 is shown as including two windings, a primary winding 108 and secondary winding 110. However, the energy transfer element 106 may have more than two windings. As shown, the uncoupled inductance $L_{LK}$ 154 may be between the power switch S1 112 and the primary winding 108. The uncoupled inductance $L_{LK}$ 154 may represent the leakage inductance associated with the energy transfer element 106 or a discrete inductor. The voltage across the uncoupled inductance $L_{LK}$ 154 may be denoted as the leakage voltage $V_L$. The voltage across the primary winding 108 is illustrated as the primary voltage $V_P$ with the positive polarity at the dot end of the primary winding 108. When the power switch S1 112 is ON, the primary voltage $V_P$ is substantially equal to the negative sum of the input voltage $V_{IN}$ 102 and the leakage voltage $V_L$, or mathematically: $V_P = -(V_{IN} + V_L)$. When the power switch S1 112 is OFF, the primary voltage $V_P$ is substantially equal to the reflected output voltage of the secondary winding 110. The primary winding 108 of the energy transfer element is further coupled to the power switch S1 112 and the power switch S1 112 is further coupled to input return 111. The voltage at the drain of the power switched S1 112 is denoted as power switch voltage $V_D$ 162, which is also the voltage across the parasitic capacitance $C_{P1}$ 156.

Coupled across the primary winding 108 and the uncoupled inductance $L_{LK}$ 154 is the active clamp circuit 104. The active clamp circuit 104 is shown as including clamp capacitance C1 144 which is coupled in series with the clamp switch 142, steering diodes D1 146, D2 148, offset element Z1 152, and diode D3. Steering diode D1 146 is coupled across the clamp switch and 142 and steering diode D2 148. Offset element Z1 169 and diode D3 150 are coupled in series and across steering diode D2 148. The clamp switch 142 is exemplified as a transistor with a body diode (anti-parallel diode). As shown, the clamp switch 142 is shown as a metal-oxide field effect transistor (MOSFET) but it should be appreciated that other transistors may be used. The clamp switch 142 is coupled such that the drain of the transistor is coupled to the clamp capacitance C1 144 while the source of the transistor is coupled to the steering diode D2 148 and the offset element Z1 152. Further the anode of steering diode D1 146 is coupled to the cathode of steering diode D2 148 and anode of diode D3 150. The cathode of steering diode D1 146 is coupled to the clamp capacitance C1 144. The anode of steering diode D2 148 is coupled to the clamp switch 142. The offset element 152 is exemplified as a Zener diode with its anode coupled to the clamp switch 142 and its cathode coupled to diode D3 150. However, other elements such as a resistor or a capacitor could be utilized for the offset element 152. Further the diode D3 150 may be optional. However, the diode D3 150 may be useful in situations where the clamp current $I_{CL}$ 166 during the on-time of the clamp switch 142 may be too high for the forward current rating of the Zener diode Z1 152.

The voltage across the clamp capacitance C1 128 is denoted as the clamp capacitance voltage $V_{C1}$, the voltage across the clamp switch 142 is denoted as $V_{CZ}$ 168, and the current in the clamp circuit is denoted as clamp current $I_{CL}$ 166. The source voltage $V_S$ 142 is the voltage at the node between the clamp switch 142 and steering diode D2 142. Further, the voltage across the offset element Z1 152 is denoted as $V_{Z1}$ 169.

The active clamp circuit 104 limits the maximum voltage on the power switch S1 112. Further, control of the clamp switch 142 of the active clamp circuit 104 facilitates zero voltage switching of the power switch S1 112. In addition, the active clamp circuit 104 may reduce RMS current in the power converter 100. Steering diodes D1 146 and D2 148 may be utilized to control the clamp current $I_{CL}$ 166 flow to the clamp capacitance C1 144, in particular when the anti-parallel diode of the clamp switch 142 is slow. Offset element Z1 152 provides a path for the capacitance $C_{P2}$ 158 associated with the clamp switch to discharge, allowing near zero-voltage switching of the clamp switch 142.

As will be further discussed, the active clamp circuit 104 is configured to receive the clamp drive signal CD 140 from the first controller 120. The transistor of the clamp switch 142 is controlled to turn on to inject current into the primary winding 108. The clamp switch 142 is turned on for a first duration prior to the power switch S1 112 turning on. In other words, the clamp switch 142 is not turned on for the entire duration that the power switch S1 112 is turned off. At or near the beginning of the off-time of the power switch S1

112, the steering diode D1 146 conducts the charge associated with the uncoupled inductance $L_{LK}$ 154 of the power converter 100. In one example, the steering diode D1 146 turns on when the drain voltage $V_D$ 162 increases to a high enough voltage to forward biases the steering diode D1 146 of the active clamp circuit 104. The drain voltage $V_D$ 162 increases at or near the beginning of the off-time of the power switch S1 112. Steering diode D2 148 blocks the charge associated with the uncoupled inductance $L_{LK}$ 154 from conducting through the anti-parallel diode of the clamp switch 142. A slow anti-parallel diode for the clamp switch 142 may cause undue ringing, as such, the anti-parallel diode is bypassed by steering diodes D1 146 and D2 148. The charge from the uncoupled inductance $L_{LK}$ 154 is transferred to the clamp capacitance C1 128 through the steering diode D1 146 and is stored. The steering diode D1 146 stops conducting substantially after the net charge associated with uncoupled inductance $L_{LK}$ 154 of the power converter 100 has been transferred.

However, use of the steering diodes D1 146 and D2 148 may block the associated capacitance $C_{P2}$ 158 of the clamp switch 142 from discharging. As a result, the voltage across the clamp switch $V_{CZ}$ 168 would not fall and would remain at a high value close to the input voltage $V_{IN}$ 102. Turning on the clamp switch 142 with a high voltage for the clamp switch voltage $V_{CZ}$ 168 would generate considerable switching losses. The offset element Z1 152 provides a path for the capacitance $C_{P2}$ 158 associated with the clamp switch 142 to discharge, allowing for near zero-voltage switching of the clamp switch 142. In other words, the offset element Z1 152 may be used to control the voltage $V_{CZ}$ 168 across the clamp switch such that the clamp switch voltage $V_{CZ}$ 168 is smaller during the off-time of the main power switch as compared to the voltage across the clamp switch if the active clamp circuit does not include an offset element Z1 152. The offset element Z1 152 allows to reduce the voltage $V_{CZ}$ 168 across the clamp switch to thereby reduce switching losses associated with the clamp switch 142 while preventing the body diode of the clamp switch 142 from conducting. While the steering diode D1 146 is conducting, the voltage across the clamp switch $V_{CZ}$ 168 falls to substantially the Zener voltage $V_{Z1}$ 169. In other words, when the steering diode D1 146 is conducting, the source voltage $V_S$ 164 of the clamp switch 142 substantially follows the drain voltage $V_D$ 162 of the power switch S1 112 minus the Zener voltage $V_{Z1}$ 169. As such, the capacitance $C_{P2}$ 158 is allowed to at least partially discharge and reduce the switching losses associated with the clamp switch 142.

The clamp switch 142 remains OFF until near the end of the OFF time of the power switch S1 112. Once it is determined that the power switch should turn ON, the clamp switch 142 is turned ON for a first duration of time. The turn on of the clamp switch 142 occurs prior to the turn on of the power switch S1 112, near the end of the off-time of the power switch S1 112. The transistor of the clamp switch 142 is turned on such that the net charge previously transferred to the clamp capacitance C1 144 associated with the uncoupled inductance $L_{LK}$ 154 is transferred to the primary winding 108. As such, the energy associated with the uncoupled inductance $L_{LK}$ 154 is returned to the system rather than being dissipated. In one example, the uncoupled inductance $L_{LK}$ 154 represents the leakage inductance of the energy transfer element 106. The clamp switch 142 is controlled such that the leakage energy is reset and returned to the power converter rather than being dissipated.

Secondary winding 110 is coupled to the output rectifier DO 114, which is exemplified as a transistor used as a synchronous rectifier. However, the output rectifier DO 114 may be a diode. Output capacitor C2 116 is shown as being coupled to the output rectifier DO 114 and the output return 117. The power converter 100 further includes circuitry to regulate the output, which in one example may be the output voltage $V_O$ 115, output current $I_O$ 119, or a combination of the two. A feedback signal $U_{FB}$ 124 representative of the output of the power converter 100 is provided to the second controller 122.

The second controller 122 is configured to receive the feedback signal FB 124, representative of the output of the power converter 100 and outputs the secondary drive signal SR 126 and the request signal REQ 128. The secondary drive signal SR 126 is received by the output rectifier DO 114 and controls the turn on and turn off of the output rectifier DO 114. The request signal REQ 128 is representative of a request to turn on the primary switch S1 112. The request signal REQ 128 may include request events which are generated in response to the feedback signal FB 124. In one example, the request signal REQ 128 may include request events which are generated in response to a comparison of the feedback signal FB 124 to a target value. The request signal REQ 128 may be a rectangular pulse waveform which pulses to a logic high value and quickly returns to a logic low value. The logic high pulses may be referred to as request events.

The first controller 120 is coupled to receive the request signal REQ 128 through a communication link 131, shown as a dashed line, and outputs the clamp drive signal CD 140 and the primary drive signal DR 134. The first controller 120 provides the primary drive signal DR 134 to the power switch S1 112 to control various switching parameters of the power switch S1 112 to control the transfer of energy from the input of to the output of the power converter 100 through the energy transfer element 106. Example of such parameters include switching frequency (or switching period), duty cycle, on-time and off-times, or varying the number of pulses per unit time of the power switch S1 112. In addition, the power switch S1 112 may be controlled such that it has a fixed switching frequency or a variable switching frequency. In one example of variable switching frequency control, the switching frequency may be reduced for light-load or no-load conditions.

The second controller 122 and the first controller 120 may communicate via the communication link 131. For the example shown, the second controller 122 is coupled to the secondary side of the power converter 100 and is referenced to the output return 117 while the first controller 120 is coupled to the primary side of the power converter 100 and is referenced to the input return 111. In particular, regulation control 131 is referenced to the input return 111. In embodiments, the first controller 120 and the second controller 122 are galvanically isolated from one another and the communication link 131 provides galvanic isolation using an inductive coupling, such as a transformer or a coupled inductor, an optocoupler, capacitive coupling, or other device that maintains the isolation. However, it should be appreciated that in some embodiments, the second controller 122 is not galvanically isolated from the first controller 120.

In one example, the first controller 120 and second controller 122 may be formed as part of an integrated circuit that is manufactured as either a hybrid or monolithic integrated circuit. In one example, the power switch S1 112 may also be integrated in a single integrated circuit package with the first controller 120 and the second controller 122. In addition, in one example, first controller 120 and second controller 122 may be formed as separate integrated circuits.

The power switch S1 112 may also be integrated in the same integrated circuit as the first controller 120 or could be formed on its own integrated circuit. Further, it should be appreciated that both the first controller 120, the second controller 122 and power switch S1 112 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT).

The first controller 122 includes the regulation control circuit 130 and the clamp control circuit 132. As shown, regulation control circuit 130 is configured to receive the request signal REQ 128 and outputs the primary drive signal DR 134, which controls the switching of power switch S1 112, and the enable signal EN 136. In one example, the enable signal EN 136 may be representative of when the power switch S1 112 is going to be enabled (or turned ON). Or in other words, the enable signal EN 136 may be representative of a determination to turn ON the power switch S1 112. Or in other words, the enable signal EN 136 is representative of enabling the clamp switch 142 to turn on.

Clamp control circuit 132 is coupled to receive the enable signal EN 137 and outputs the clamp drive signal CD 140. The clamp drive signal CD 140 controls various switching parameters of the clamp switch 142, such as the on-times or off-times of the clamp switch 142. In one embodiment, the clamp drive signal CD 140 is a rectangular pulse waveform with varying durations of logic high and logic low sections, logic high sections corresponding to the clamp switch 142 being on and logic low sections corresponding to the clamp switch 142 being off.

In one example, the clamp control circuit 132 via the clamp drive signal CD 140 controls the amount of current provided to the primary winding 108 such that the net charge associated with the uncoupled inductor $L_{LK}$ 154 is transferred to the primary winding 108. In one example, in response to the enable signal EN 136, the clamp control circuit 132 outputs the clamp drive signal CD 140 to turn on the clamp switch 142 for the first duration $T_A$. The first duration $T_A$ may be selected such that sufficient charge is provided from the active clamp circuit 104 to the primary winding 108, which will be used to discharge the parasitic capacitance $C_{P1}$ 156. As mentioned above, the net charge to be transferred to the primary winding 108 (and ergo current) is substantially the same as the amount of charge that was transferred from the uncoupled inductor $L_{LK}$ 154 to the clamp capacitance C1 144. As such, a shorter first duration $T_A$ corresponds to a larger switch voltage $V_D$ 162 on the power switch S1 112. Too large of a voltage $V_D$ 162 may damage the power switch S1 112. However, the longer the first duration $T_A$, the higher the root-mean-square (RMS) current experienced by the power converter. In one example, the first duration $T_A$ of time that the clamp switch 142 is turned on may be selected to be substantially equal to the duration of time during which the steering diode D1 146 conducts.

The regulation control circuit 130 is also coupled to receive the clamp drive signal CD 140 and outputs the primary drive signal DR 134. As shown, the regulation control circuit 130 is also coupled to receive the current sense signal ISNS 138 representative of the switch current $I_D$ 160 of power switch S1 112. In embodiments, the regulation control circuit 130 turns on the power switch S1 112 after the clamp drive signal CD 140 indicates that the clamp switch 142 has been turned off. Or in other words, the regulation control circuit outputs the primary drive signal DR 134 to turn on the power switch S1 112 after a trailing edge in the clamp drive signal CD 140. Further, the regulation control circuit 130 does not turn on the power switch S1 112 until a second duration of time has passed after the clamp switch 142 has turned off. The second duration of time may be selected to provide sufficient time for the power switch voltage $V_D$ 162 to fall to substantially zero (or in other words, to provide sufficient time for the parasitic capacitance $C_{P1}$ 156 to discharge completely to the primary winding 108) before power switch S1 112 is turned on, this allowing for zero voltage switching of the power switch S1 112. In one embodiment, the regulation control circuit 130 may turn off the power switch S1 112 when the switch current $I_D$ 160 provided by the current sense signal ISNS 138 reaches a current limit.

Figure 2:
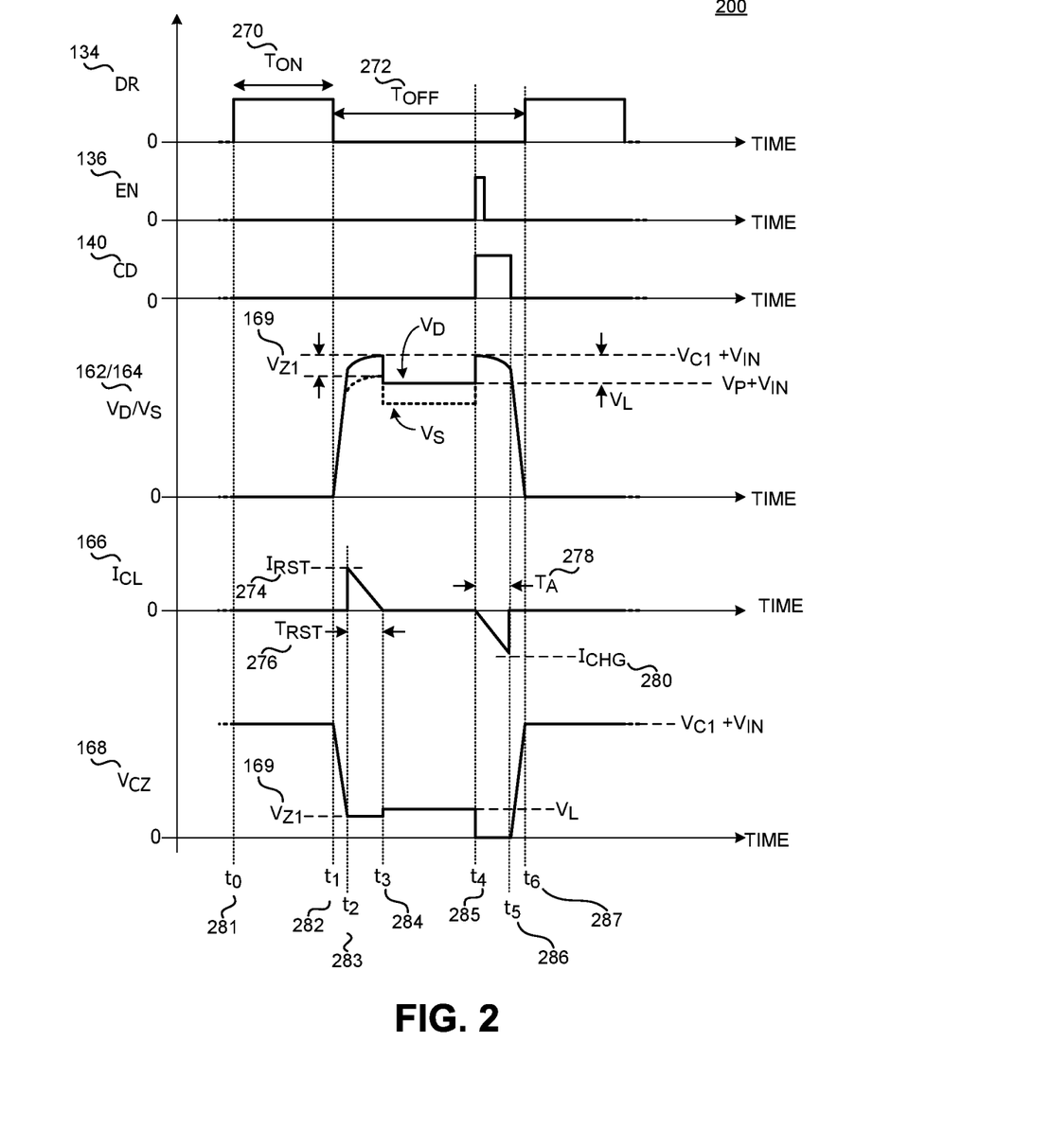
FIG. 2 is a timing diagram illustrating example waveforms of various signals in FIG. 1, in accordance with an embodiment of the present disclosure.

FIG. 2 illustrates a timing diagram 200 of example waveforms of the primary drive signal DR 134, enable signal EN 136, clamp drive signal CD 140, power switch voltage $V_D$ 162, source voltage $V_S$ 164, clamp current $I_{CL}$ 166, and clamp switch voltage $V_{CZ}$ 168, which correspond with similarly named and numbered elements as shown in FIG. 1 and the remaining figures.

At time $t_0$ 281, the primary drive signal DR 134 transitions to a logic high value and the power switch S1 112 is turned on. The switch current $I_D$ 160 would begin to increase from a zero or non-zero value, depending if the power converter 100 is operating in discontinuous conduction mode (DCM) or continuous conduction mode (CCM). The rate which the switch current $I_D$ 160 increases is partially determined by the input voltage $V_{IN}$ 102 and the inductance of the primary winding 108. In one embodiment, the switch current $I_D$ 160 increases until the current limit is reached at time $t_1$ 282, which will cause the regulation control circuit 130 to output the primary drive signal DR 134 to turn off the power switch S1 112. Thus, at time $t_1$ 282, the primary drive signal DR 134 transitions to a logic low value and the power switch S1 112 is turned off. During the on-time $T_{ON}$ 270, the enable signal EN 136 and clamp drive signal CD 140 are substantially logic low, while the power switch voltage $V_D$ 162, source voltage $V_S$ 164, clamp current $I_{CL}$ 166 are substantially equal to zero. Further, the clamp switch voltage $V_{CZ}$ 168 is substantially equal to the sum of input voltage $V_{IN}$ 102 and the clamp capacitance voltage $V_{C1}$ across clamp capacitance 144. During the on-time $T_{ON}$ 270, the voltage $V_{C1}$ across the clamp capacitance C1 144 is substantially equal to the reflected voltage on the primary winding 108 plus any remaining voltage from the leakage charge.

When the power switch S1 112 turns off, current is induced in the secondary winding 110 and the voltage on the secondary winding 110 is high enough that the output rectifier DO 114 beings to conduct. In addition, when the power switch S1 112 is off, the voltage across the secondary winding 110 is reflected to the primary winding 108, and the switch voltage $V_D$ 162 therefore also increases due to the charging of the parasitic capacitance $C_{P1}$ 156. The switch current $I_D$ 160 (which is the current at the drain of the power switch when the power switch is a transistor) decreases to substantially zero. The source voltage $V_S$ 164 substantially follows the power switch voltage $V_D$ 162 minus the offset provided by the Zener voltage $V_{Z1}$ 169. For the example, the source voltage $V_S$ 164 (dashed line) and the switch voltage $V_D$ 162 (solid line) are shown in the same timing axis to illustrate their similarities. At time $t_1$ 282, the clamp switch voltage $V_{CZ}$ 168 begins to decrease due to the discharging of the associated capacitance $C_{P2}$ 158 of the clamp switch 142. As shown, diode D3 150 and offset element Z1 152 provide a path for the associated capacitance $C_{P2}$ 158 of the clamp switch 142 to discharge.

At time $t_2$ 283, the switch voltage $V_D$ 162 increases to a high enough voltage that forward biases steering diode D1 146 of the active clamp circuit 104. The clamp current $I_{CL}$ 166 is substantially non-zero (due to current which charged the parasitic capacitance $C_{P1}$ 156) and flows through the steering diode D1 146 to the clamp capacitance C1 144. The steering diode D2 148 prevents the anti-parallel diode of the clamp switch 142 from becoming forward biased. The direction of the clamp current $I_{CL}$ 166 is indicated by the positive value of the clamp current $I_{CL}$ 166 shown in FIG. 2. As illustrated, the peak value of the clamp current $I_{CL}$ 166 is denoted as the peak reset current $I_{RST}$ 274. The magnitude of the clamp current $I_{CL}$ 166 decreases as charge is transferred from the uncoupled inductance $L_{LK}$ 154 through the steering diode D1 146 to the clamp capacitance C1 144. In one example, the steering diode D1 146 conducts the clamp current $I_{CL}$ 166 to the clamp capacitance C1 144 for a duration of time that is substantially equal to a reset duration $T_{RST}$ 276, as shown in FIG. 2. In one example, the length of the reset duration $T_{RST}$ 276 is substantially equal to the first duration $T_A$ 278 as also mentioned above.

The switch voltage $V_D$ 162 is substantially equal to the sum of the clamp capacitance voltage $V_{C1}$ and the input voltage $V_{IN}$ 102, or mathematically: $V_D=V_{C1}+V_{IN}$, assuming the forward voltage drop of steering diode D1 146 is substantially zero or negligible. In some embodiments, the forward voltage drop of steering diodes D1 146, D2 148 and diode D3 150 may be substantially equal to zero. In some embodiments, the forward voltage drop of these diodes may be substantially equal to 0.7 V. In addition, the peak clamp capacitance voltage $V_{C1}$ is substantially equal to the sum of the primary voltage $V_P$ and the leakage voltage $V_L$, or mathematically: $V_{C1}=V_P+V_L$. The duration between time $t_2$ 283 and time $t_3$ 284 is referred to as the reset duration $T_{RST}$ 276. In one example, the reset duration $T_{RST}$ 276 is substantially the conduction time of the steering diode D1 146 when the anti-parallel diode conducts the clamp current $I_{CL}$ 166 to the clamp capacitance C1 144. During the reset duration $T_{RST}$ 276, the net charge associated with the uncoupled inductance $L_{LK}$ 154 is transferred to and stored by clamp capacitance C1 144. As such, during the reset duration $T_{RST}$ 276, the clamp voltage $V_{C1}$ (and ergo the switch voltage $V_D$ 162) increases as the leakage voltage $V_L$ decreases. The source voltage $V_S$ 164 substantially follows the switch voltage $V_D$ 162 minus the Zener voltage $V_{Z1}$ 169 of the offset element Z1 152. During the reset duration $T_{RST}$ 276, the clamp switch voltage $V_{CZ}$ 168 is substantially equal to the voltage of the offset element Z1 152, which in one embodiment is the Zener voltage $V_{Z1}$ 169.

At time $t_3$ 284 at the end of the reset duration $T_{RST}$ 276, the net charge from the uncoupled inductance $L_{LK}$ 154 is transferred to and stored by clamp capacitance C1 144 and the steering diode D1 146 stops conducting. As illustrated, just prior to time $t_3$ 284, the switch voltage $V_D$ 162 has reached the peak value as the charge from the uncoupled inductance $L_{LK}$ 154 has transferred to the clamp capacitance C1 144. Further, the clamp current $I_{CL}$ 166 is substantially equal to zero the leakage voltage $V_L$ is substantially zero. During the off-time $T_{OFF}$ 272 of the power switch S1 112, the primary voltage $V_P$ is substantially equal to the reflected output voltage of the power converter plus the added voltage $V_L$ from the uncoupled inductor $L_{LK}$ 154. The reflected output voltage is determined by the turns ratio between the primary winding 108 and the secondary winding 110 and the output voltage $V_O$ 115. At time $t_3$ 284, the clamp voltage $V_{C1}$ is high enough such that the steering diode D1 146 is reverse biased and does not conduct. As such, the switch voltage $V_D$ 162 decreases and is substantially clamped to the sum of the primary voltage $V_P$ and the input voltage $V_{IN}$ 102 since the charge from the uncoupled inductor $L_{LK}$ 154 has been transferred to the clamp capacitance C1 144 and the voltage across the uncoupled inductor $L_{LK}$ 154 is substantially equal to zero at this time, or mathematically: $V_D=V_P+V_{IN}$. The difference between the peak value of the switch voltage $V_D$ 162 during the reset duration $T_{RST}$ 276 and the clamped value of the switch voltage $V_D$ 162 after time $t_3$ 284 is substantially the value of the leakage voltage $V_L$ which was transferred to the clamp capacitance C1. The source voltage $V_S$ 164 substantially follows the switch voltage $V_D$ 162 minus the Zener voltage $V_{Z1}$ 169 of the offset element Z1 152. As such, the source voltage $V_S$ 164 is also clamped after the reset duration $T_{RST}$ 276. After the reset duration $T_{RST}$ 276, between times $t_3$ 284 and $t_4$ 285, the clamp switch voltage $V_{CZ}$ 168 is substantially equal to the leakage voltage $V_L$ at time $t_2$ 283 (which, in some examples is the maximum value of the leakage voltage $V_L$).

Typical active clamp circuits generally did not include steering diode D1 146 and would rely on the turn the anti-parallel diode of the clamp switch 142 to transfer the charge associated to the uncoupled inductance $L_{LK}$ 154. Once the anti-parallel diode of the clamp switch 142 has stopped conducting, the clamp switch 142 would turn on. Previously, turning on the clamp switch after the anti-parallel diode stopped conducting could lead to the clamp current $I_{CL}$ 166 to resonate and increase the RMS current which made zero voltage switching difficult to achieve for flyback converters operating at a low switching frequency. However, in accordance with examples of the present invention, the clamp switch 142 is not turned on until near the end of the off-time $T_{OFF}$ 272. As such, zero voltage switching can be achieved for a variable frequency converter and the RMS currents may be reduced. Further, as discussed above, a slow anti-parallel diode for the clamp switch 142 may cause undue ringing, and as such, the anti-parallel diode is bypassed by steering diodes D1 146 and D2 148. In addition, the offset element Z1 152 provides a path for the capacitance $C_{P2}$ 158 associated with the clamp switch 142 to mostly discharge, allowing for near zero-voltage switching of the clamp switch 142 and reduce the switching losses associated with the clamp switch 142.

At time $t_4$ 285, regulation control circuit 130 has determined that the power switch S1 112 should turn on. In one example, the regulation control circuit 130 has determined that the power switch S1 112 should turn on in response to the received request signal REQ 128. As such, the enable signal EN 136 transitions to the logic high value, and the clamp control circuit 132 outputs a logic high value for the clamp drive signal CD 140 to turn on the clamp switch 142. The clamp drive signal CD 140 remains logic high for the first duration $T_A$ 278, which may also be referred to as a charge duration and illustrated in FIG. 2 as the duration of time between time $t_4$ 285 and $t_5$ 286. As shown, the clamp switch voltage $V_{CZ}$ 168 is substantially equal to the leakage voltage $V_L$ at time $t_2$ 283. As such, the clamp switch voltage $V_{CZ}$ 168 is switched at near-zero voltage. Without the offset element Z1 152, the clamp switch voltage $V_{CZ}$ 168 would be substantially equal to the sum of the clamp voltage $V_{C1}$ and the input voltage $V_{IN}$ 102 at time $t_4$ 285. It should be appreciated that turning on the clamp switch 142 with such a high voltage would have significant switching losses. By including an offset element Z1 152, the clamp switch 142 can be turned on with much lower clamp switch voltage $V_{CZ}$ 168 and the overall switching losses for the clamp switch 142 may be reduced. The magnitude of the clamp current $I_{CL}$ 166 begins to increase as the clamp current $I_{CL}$ 166 flows from the clamp capacitance C1 144 through the clamp switch 142 and steering diode D2 148. The direction of the clamp current $I_{CL}$ 166 is indicated by the negative value of the clamp current $I_{CL}$ 166 as shown in FIG. 2. The switch voltage $V_D$ 162 also increases to the sum of the clamp voltage $V_{C1}$ and the input voltage $V_{IN}$ 102 at time $t_4$ 285.

The duration between time $t_4$ 285 and time $t_5$ 286 is illustrated as the first duration $T_A$ 278. During the first duration $T_A$ 278, charge is transferred from the clamp capacitance C1 144 to the primary winding 108. The first duration $T_A$ 278 may be selected such that the net charge associated with the uncoupled inductance $L_{LK}$ 154 that was previously transferred to and stored by clamp capacitance C1 144 during the reset duration $T_{RST}$ 276 is transferred to the primary winding 108 during first duration $T_A$ 278. As shown, at the beginning of the first duration $T_A$ 278, the switch voltage $V_D$ 162 is substantially equal to the sum of the clamp voltage $V_{C1}$ and the input voltage $V_{IN}$ 102 and decreases as the charge on the clamp capacitance C1 144 is transferred to the primary winding 108. During this time, there is no current through the offset element Z1 152 and diode D3 150 and the source voltage $V_S$ 164 substantially follows the switch voltage $V_D$ 162, assuming the forward voltage of the steering diode D2 148 is substantially zero or negligible. The peak magnitude of the clamp current $I_{CL}$ 166 during the first duration $T_A$ 278 is substantially the peak charge current $I_{CHG}$ 280. In one example, if the first duration $T_A$ 278 is less than the conduction time of the steering diode D1 146, the switch voltage $V_D$ 162 would increase to a value higher than the sum of the clamp voltage $V_{C1}$ and the input voltage $V_{IN}$ 102 at time $t_4$ 285. If the first duration $T_A$ 278 is greater than the conduction time of the steering diode D1 146, the switch voltage $V_D$ 162 would increase to a lower value than the sum of the clamp voltage $V_{C1}$ and the input voltage $V_{IN}$ 102 at time $t_4$ 285. FIG. 2 illustrates some curvature in the switch voltage $V_D$ 162 and the source voltage $V_S$ 164 between times $t_2$ 283 and $t_3$ 284 and between times $t_4$ 285 and $t_5$ 286. The amount of curvature may be in part related to the size of the clamp capacitance C1 144. The larger the clamp capacitance C1 144, the less curvature in the switch voltage $V_D$ 162 and the source voltage $V_S$ 164 between times $t_2$ 283 and $t_3$ 284 and between times $t_4$ 285 and $t_5$ 286.

To illustrate, the net charge during the reset duration $T_{RST}$ 276 is substantially equal to the product of the peak reset current $I_{RST}$ 274 and the reset duration $T_{RST}$ 276. The net charge during the first duration $T_A$ 278 is substantially equal to the product of the peak charge current $I_{CHG}$ 280 and the first duration $T_A$ 278. In a steady condition, the amount of net charge transferred to the clamp capacitance C1 144 during the reset duration $T_{RST}$ 276 should equal to the amount of charge transferred from the C1 144 during the first duration $T_A$ 278, or mathematically: $I_{RST} \times T_{RST} = I_{CHG} \times T_A$. As mentioned above, during the off-time the primary voltage $V_P$ is substantially constant value equal to the reflected output voltage of the power converter. Further, the clamp voltage $V_{C1}$ is also a substantially constant value once the charge has been transferred. As such, the voltage applied to the uncoupled inductance $L_{LK}$ 154 is substantially the leakage voltage $V_L$ and the difference between the peak value of the switch voltage $V_D$ 162 and the clamped value of the switch voltage $V_D$ 162 is substantially the leakage voltage $V_L$. Since the amount of charge is the same during the reset duration and the first duration, $$\frac{V_L T_{RST}}{2L_{LK}} = \frac{V_L T_A}{2L_{LK}}.$$

As such, in one example the first duration $T_A$ 278 is substantially equal to the reset duration $T_{RST}$ 276. Further, if the first duration $T_A$ 278 and the reset duration $T_{RST}$ 276 are substantially equal, the peak reset current $I_{RST}$ 274 and the peak charge current $I_{CHG}$ 280 are also substantially equal. In addition, the leakage voltage $V_L$ is a function of the peak reset current $I_{RST}$ 274, uncoupled inductance $L_{LK}$ 154, and the first duration $T_A$ 278, or mathematically:

$$V_L = L_{LK} \times \frac{I_{RST}}{T_A}.$$

At time $t_5$ 286 (end of the first duration $T_A$ 278), the clamp drive signal CD 140 transitions to a logic low value and the clamp switch 142 is turned off. The second duration delay begins and the switch voltage $V_D$ 162 decreases as the parasitic capacitance $C_{P1}$ 156 is discharged. The second duration may be selected such that there is sufficient time for the parasitic capacitance $C_{P1}$ 156 to completely discharge and the switch voltage $V_D$ 162 to fall to substantially zero before the power switch S1 112 is turned on. At time $t_6$ 287 (end of the second duration $T_B$), the switch voltage $V_D$ 162 has fallen to substantially zero and the primary drive signal DR 134 transitions to a logic high value and the power switch S1 112 is turned on. As such, the energy associated with the uncoupled inductance (i.e. leakage inductance) is returned to the system rather than being dissipated.

Figure 3:
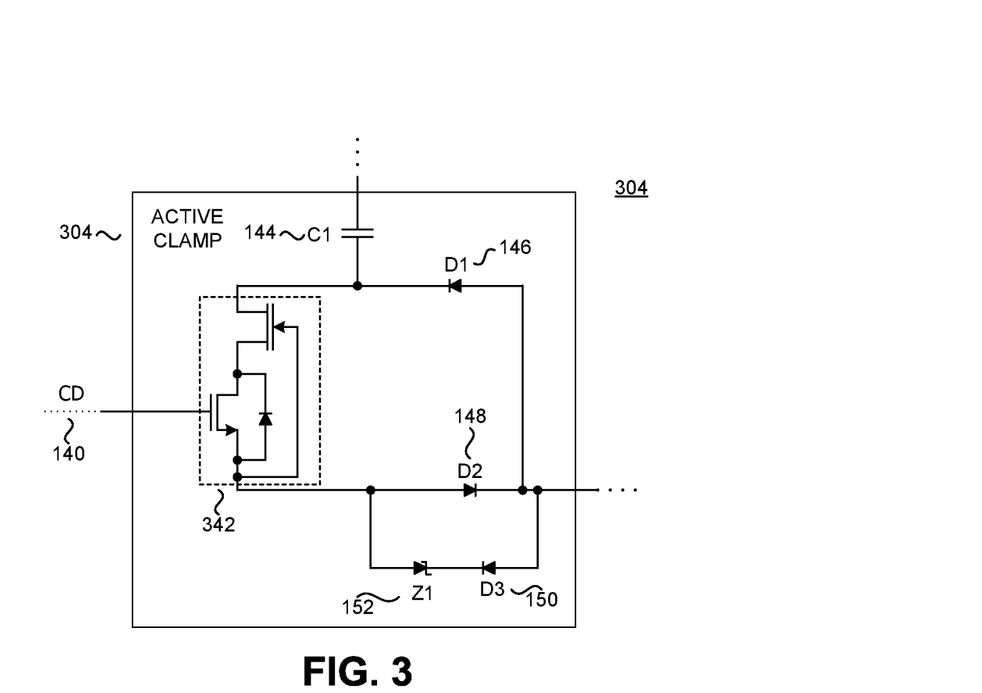
FIG. 3 is a diagram illustrating an example of the active clamp circuit, in accordance with an embodiment of the present disclosure.

FIG. 3 illustrates another example active clamp circuit 304. It should be appreciated that similarly named and numbered elements couple and function as described above. The active clamp circuit 304 shown in FIG. 3 shares many similarities with the active clamp circuit 104 shown in FIG. 1. At least one difference, however, is the clamp switch 342 is exemplified as a cascode switch, or otherwise known as a hybrid switch. The cascode switch of clamp switch 342 may include a normally-on device and a normally-off device. In one example, the normally-on device may be a high-voltage GaN transistor, while the normally-off device may be a low-voltage MOSFET. The source and gate of the normally-off device (e.g., MOSFET) are used as the source and gate of the cascode switch of clamp switch 342, while the drain of the normally-on device (e.g., GaN transistor) is used as the drain of the cascode switch. The source of the normally-on device (e.g., GaN transistor) is coupled to the drain of the normally-off device (e.g., MOSFET) while the gate of the normally-on device (e.g., GaN transistor) is coupled to the source of the normally-on device (e.g., MOSFET). The normally-off device is generally used to turn on and off the normally-on device. As shown, the drain of the normally-on device is coupled to the clamp capacitance C1 144 while the source of the normally-off device is coupled to the offset element Z1 152 and steering diode D2 148.

A cascode switch may have a large output capacitance (Coss) which may cause ringing at the drain of the power switch S1 112. As such, the steering diodes D1 146 and D2 148 may be utilized to minimize the ringing while the offset element Z1 152 may reduce switching losses.

Figure 4:
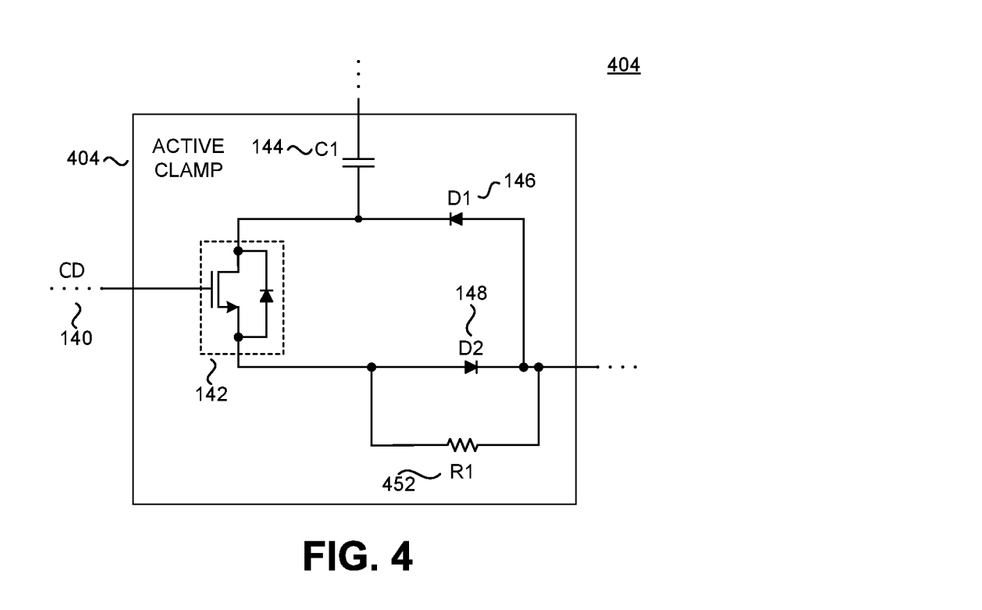
FIG. 4 is a diagram illustrating another example of the active clamp circuit, in accordance with an embodiment of the present disclosure.

FIG. 4 illustrates another example active clamp circuit 404. It should be appreciated that similarly named and numbered elements couple and function as described above. The active clamp circuit 404 shown in FIG. 4 shares many similarities with the active clamp circuit 104 shown in FIG. 1. At least one difference, however, is the offset element 452 is exemplified by a resistance R1 452. The resistance R1 452 is coupled across steering diode D2 148. Similar to FIG. 1, the steering diodes D1 146 and D2 148 may be utilized to minimize the ringing while the offset element R1 452 may reduce switching losses. The offset element R1 452 provides a path to discharge the capacitances related to the clamp switch 142 to reduce switching losses of the clamp switch 142.

Figure 5:
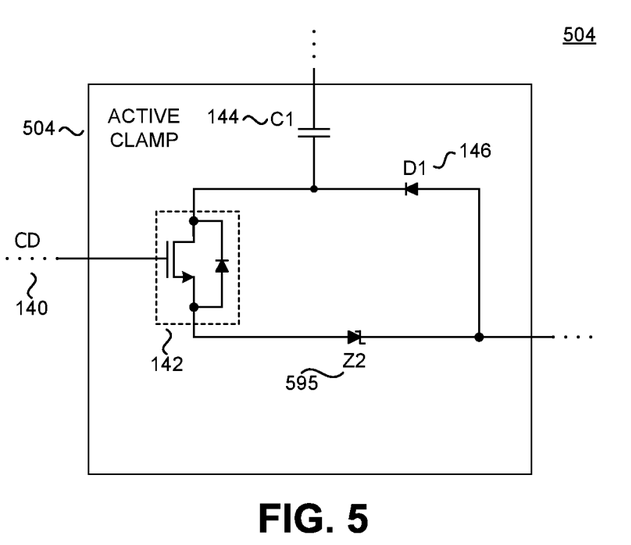
FIG. 5 is a diagram illustrating a further example of the active clamp circuit, in accordance with an embodiment of the present disclosure.

FIG. 5 illustrates another example active clamp circuit 504. It should be appreciated that similarly named and numbered elements couple and function as described above. The active clamp circuit 504 shown in FIG. 5 shares many similarities with the active clamp circuit 104 shown in FIG. 1. At least one difference, however, is the Zener diode Z2 595 may be utilized as both a steering diode and an offset element 452. The Zener diode Z2 595 is shown as coupled to the clamp switch 142 and anode of steering diode D1 146. Further, the anode of Zener diode Z2 595 is coupled to the clamp switch 142 while the cathode of Zener diode Z2 595 is coupled to the anode of steering diode D1 146. The steering diode D1 146 and the Zener diode Z2 595 may be utilized to control the clamp current $I_{CL}$ 166 flow to the clamp capacitance C1 144. Zener diode Z2 595 blocks the charge associated with the uncoupled inductance $L_{LK}$ 154 from conducting through the anti-parallel diode of the clamp switch 142. The Zener diode Z2 595 may also reduce switching losses by acting as an offset element. The Zener diode Z2 595 provides a path to discharge the capacitances related to the clamp switch 142, allowing near zero-voltage switching of the clamp switch 142 to reduce switching losses of the clamp switch 142.

Figure 6:
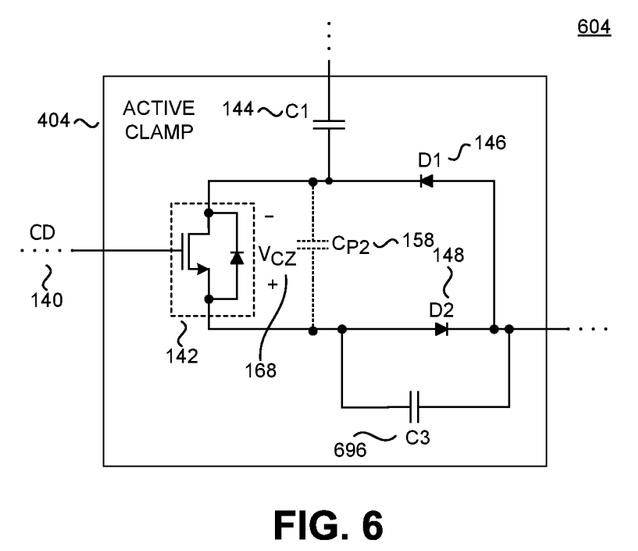
FIG. 6 is a diagram illustrating an example of the active clamp circuit, in accordance with an embodiment of the present disclosure.

FIG. 6 illustrates another example active clamp circuit 604. It should be appreciated that similarly named and numbered elements couple and function as described above. The active clamp circuit 604 shown in FIG. 6 shares many similarities with the active clamp circuits discussed above. At least one difference, however, is the offset element is exemplified by a capacitance C3 696. One end of the capacitance C3 696 is shown as coupled to the clamp switch 142. The other end of capacitance C3 696 is shown as coupled to the anode of steering diode D1 146 and the cathode of steering diode D2 148. Or in other words, the capacitance C3 696 is coupled across the steering diode D2 148. The steering diodes D1 146 and D2 148 may be utilized to control the clamp current $I_{CL}$ 166 flow to the clamp capacitance C1 144. Capacitance C3 696 may also reduce switching losses by acting as an offset element.

The stored charge on the associated capacitance $C_{P2}$ 158 of the clamp switch when the power switch S1 112 is on may be transferred to capacitance C3 696 when the power switch S1 112 is turned off. The voltage of capacitance C3 696 can provide sufficient blocking voltage such that the clamp current $I_{CL}$ 166 flows through diode D1 during the off time of the power switch S1 112 and retain a small clamp voltage $V_{CZ}$ 168 across the clamp switch 142. The blocking voltage across the capacitance C3 696 may be the product of the voltage across the clamp switch 142 when the power switch S1 112 and the associated capacitance $C_{P2}$ 158 divided by the sum of the associated capacitance $C_{P2}$ 158 and capacitance C3 696, or mathematically:

$$V_{C2} = VCZ_{TOFF}\frac{CP2}{C3+CP2}.$$

Figure 7:
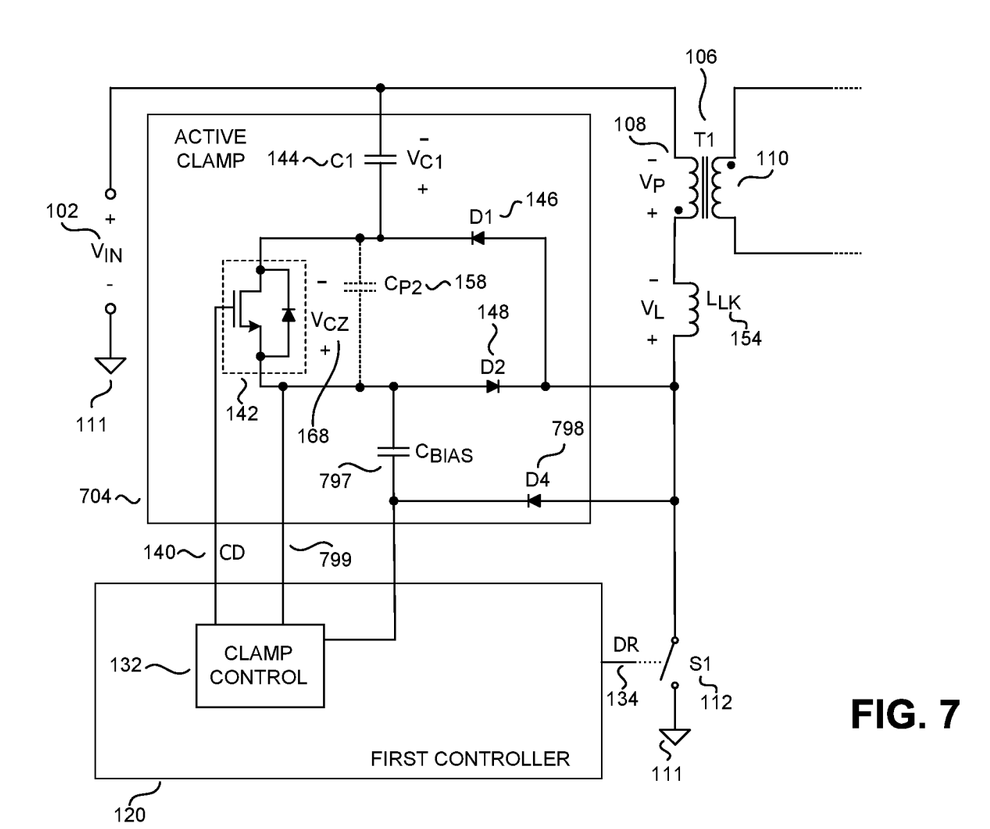
FIG. 7 is a diagram illustrating an even further example of the active clamp circuit, in accordance with an embodiment of the present disclosure.

FIG. 7 illustrates another example active clamp circuit 704. It should be appreciated that similarly named and numbered elements couple and function as described above. The active clamp circuit 704 shown in FIG. 7 shares many similarities with the active clamp circuits discussed above. In particular, active clamp circuit 704 shares many similarities with the active clamp circuit 605 shown in FIG. 6, at least one difference, however, is the offset element is exemplified by a bias capacitance $C_{BIAS}$ 797 for the clamp control 132 of the first controller 120. One end of the bias capacitance $C_{BIAS}$ 797 is shown as coupled to the clamp switch 142 and steering diode D2 148. The other end of bias capacitance $C_{BIAS}$ 797 is coupled to clamp control 132 of the first controller 120. The active clamp circuit 704 also includes a diode D4 798 coupled to the bias capacitance $C_{BIAS}$ 797. Diode D4 798 is coupled such that the anode of diode D4 798 is coupled to the power switch S1 112 while the cathode of diode D4 798 is coupled to bias capacitance $C_{BIAS}$ 797. As shown in FIG. 7, a clamp return 799 for the clamp control 132 is coupled to the clamp switch 142. In particular, the clamp return 799 is coupled to the source of the clamp switch 142.

Similar to the capacitance C3 696 discussed above, the stored charge on the associated capacitance $C_{P2}$ 158 of the clamp switch when the power switch S1 112 is on may be transferred to bias capacitance $C_{BIAS}$ 797 when the power switch S1 112 is turned off. A high side coupled switch and associated driver, such as the clamp switch 142 and respective clamp control 132, may need an additional bias to drive the clamp switch 142. The bias capacitance $C_{BIAS}$ 797 may be utilized to provide bias current to the clamp control 132 of the first controller 120, in particular, for the driver utilized to drive the clamp switch 142, to supply the source for the bias. The bias current may be received by the first controller 120 while a regulator internal to the first controller 120 determines the voltage across the bias capacitance $C_{BIAS}$ 797. The average bias current is the product of the stored charge of the associated capacitance $C_{P2}$ 158 of the clamp switch and the switching frequency $f_{SW}$ of the power switch S1 112, or mathematically: $I_{BIAS} = Q_{CP2}f_{SW}$.

Figure 8:
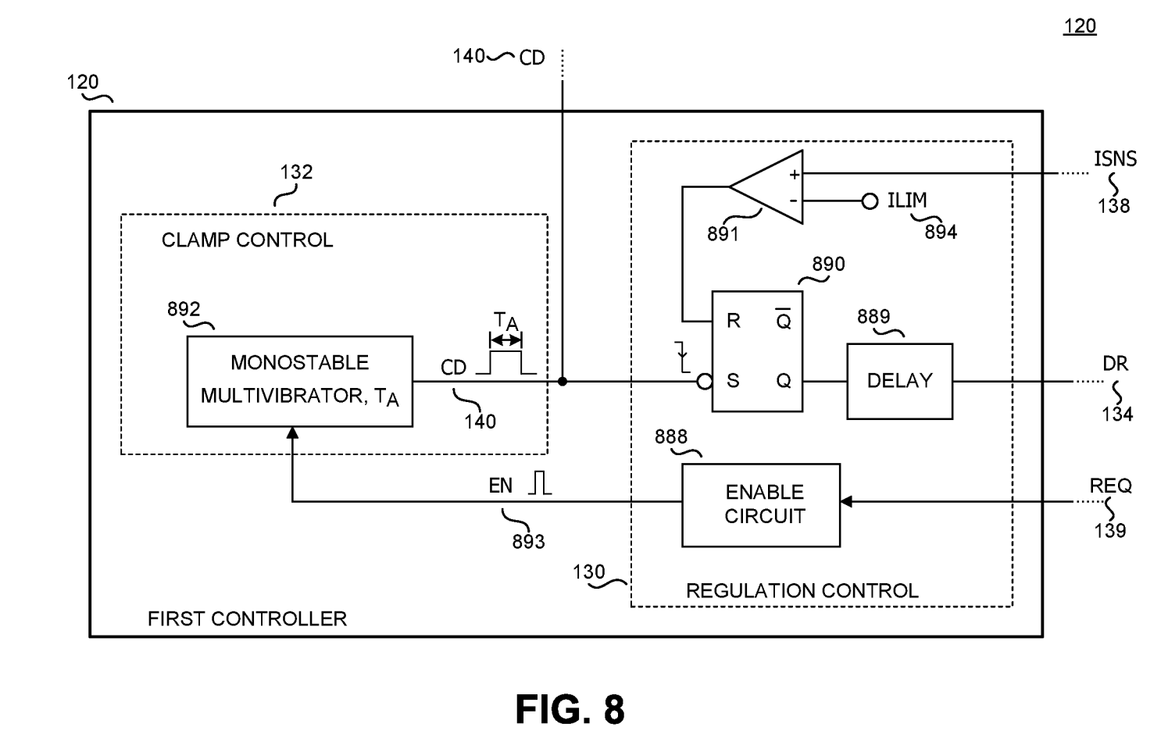
FIG. 8. is a diagram of an example first controller of FIG. 1, in accordance with an embodiment of the present disclosure.

FIG. 8 illustrates a diagram of an example first controller 120 of FIG. 1. The first controller 120 is shown as included a regulation control circuit 130 and a clamp control circuit 132. As shown, the regulation control circuit 130 includes an enable circuit 888, a latch 890, a comparator 891, and a delay circuit 889. The clamp control circuit 132 is shown as including a monostable multivibrator 892, which is also referred to as a one-shot.

As shown, the enable circuit 888 is configured to receive the request signal REQ 139 and output the enable signal EN 893. In one example, the request signal REQ 139 is representative of a request to turn on the power switch S1 110. In response to a request event in the request signal REQ 139, the enable circuit 888 outputs a pulse in the enable signal EN 893. The enable signal EN 893 may be representative of a determination by the first controller 120 to turn on the power switch S1 110. Or in other words, the enable signal EN 893 may be representative of enabling the clamp control circuit 132 to turn on the clamp switch 142. In another embodiment, the regulation control circuit 130 does not include the enable circuit and the request signal REQ 139 is received by the clamp control circuit 132.

The monostable multivibrator 892 of the clamp control circuit 132 is configured to receive the enable signal EN 893 or the request signal REQ 139. In response to either the enable signal EN 893 or the request signal REQ 139, the monostable multivibrator 892 outputs a pulse for the first duration $T_A$ of time. In one embodiment, the monostable multivibrator 892 outputs a pulse for the first duration $T_A$ of time response to an edge (leading edge or trailing edge) in the enable signal EN 893 or the request signal REQ 139. In response to the clamp drive signal CD 140, the clamp switch 142 is turned on for the first duration $T_A$, at which time the net charge associated with the uncoupled inductance $L_{LK}$ 154 that was previously transferred to and stored by clamp capacitance C1 144 during a previous reset duration $T_{RST}$ 269 is transferred to the primary winding 108, as discussed in detail above. At the end of the first duration $T_A$, the clamp drive signal CD 140 transitions to a logic low value and the clamp switch 142 is turned off.

Latch 890 of the regulation control circuit 130 is coupled to receive the clamp drive signal CD 140 at its set-input. The small circle at the set-input of the latch 890 represents an inverter and indicates that the latch 890 is set at the falling edge of the clamp drive signal CD 140. Or in other words, the Q-output of the latch 890 transitions to a logic high value when the clamp drive signal CD 140 transitions to a logic low value. The output of the latch 890 is further received by the delay circuit 889. The output of the delay circuit 889 is the primary drive signal DR 134, which controls the switching of power switch S1 112. The delay circuit 889 delays the output of the latch 890 for second duration of time. As discussed above, there is a delay of a second duration between turning off the clamp switch 142 and turning on the power switch S1 112 to allow the switch voltage $V_D$ 162 to fall to substantially zero.

Latch 890 is also configured to receive the output of comparator 891 at its reset-input. As show, comparator 891 is coupled to receive the current sense signal ISNS 138, representative of the switch current $I_D$ 160, at its non-inverting input and the current limit ILIM 894 at its inverting input. When the current sense signal 138 reaches the current limit ILIM 894, the output of comparator 891 is logic high and latch 890 is reset. As such, the primary drive signal DR 134 transitions to a logic low value and turns off the power switch S1 112.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1

A power converter, comprising: an energy transfer element coupled between an input of the power converter and an output of the power converter; a power switch coupled to the energy transfer element; an active clamp circuit coupled to the energy transfer element and the power switch, the active clamp circuit comprising: a capacitance, a steering diode network coupled to the capacitance and configured to transfer a charge to the capacitance; a clamp switch coupled to the capacitance and configured to transfer the charge stored in the capacitance to the energy transfer element; an offset element coupled to the clamp switch and configured to provide a path to discharge a capacitance associated with the clamp switch; and a first controller coupled to the active clamp circuit and to the power switch, and configured to output a clamp drive signal to control the turn on and turn off of the clamp switch and a primary drive signal to control the turn on and turn off of the power switch, wherein the first controller is configured to turn on and turn off the clamp switch prior to the turn on of the power switch.

Example 2

The power converter of example 1, the steering diode network comprising: a first diode coupled between the capacitance and the power switch, an anode of the first diode coupled to the power switch, and a cathode of the first diode coupled to the capacitance; and a second diode coupled between the clamp switch and the power switch, an anode of the second diode coupled to the clamp switch, and a cathode of the second diode coupled to the power switch, wherein the first diode is configured to transfer charge to the capacitance and the second diode is configured to transfer charge from the capacitance to the energy transfer element.

Example 3

The power converter of example 1 or 2, wherein the charge transferred from the capacitance of the active clamp circuit, that is injected into a primary winding, is previously transferred at or near a beginning of an off time of the power switch through the first diode from a leakage inductance of the power converter.

Example 4

The power converter of any one of examples 1 to 3, wherein substantially no current is conducted through the clamp switch or the steering diode network after the charge from the leakage inductance has been transferred to the capacitance at or near the beginning of the off time of the power switch, and before the clamp switch is turned on near an end of the off time of the power switch to inject the charge stored in the capacitance into the primary winding.

Example 5

The power converter any one of examples 1 to 4, wherein the offset element comprises a Zener diode.

Example 6

The power converter of any one of examples 1 to 5, wherein the steering diode network also comprises the Zener diode, an anode of the Zener diode is coupled to the clamp switch and a cathode of the Zener diode is coupled to the power switch.

Example 7

The power converter of any one of examples 1 to 6, wherein the Zener diode is coupled in series with a third diode, an anode of the third diode is coupled to the power switch, and a cathode of the third diode is coupled to the offset element.

Example 8

The power converter of any one of examples 1 to 7, wherein the offset element comprises a resistance.

Example 9

The power converter of any one of examples 1 to 8, wherein the offset element comprises a capacitance.

Example 10

The power converter of any one of examples 1 to 9, wherein the clamp switch comprises a metal-oxide-semiconductor field-effect transistor.

Example 11

The power converter of any one of examples 1 to 10, wherein the clamp switch comprises a cascode switch, the cascode switch comprising: a normally-on device coupled to the capacitance; and a normally-off device coupled to the normally-on device, the normally-off device coupled to the offset element.

Example 12

The power converter of any one of examples 1 to 11, wherein the first controller comprises: a regulation control circuit configured to generate the primary drive signal in response to a request signal including request events representative of a request to turn on the power switch to control a transfer of energy from the input of the power converter to the output of power converter; and a clamp control circuit configured to generate a clamp drive signal in response to a signal representative of a determination to turn on the power switch, wherein the clamp drive signal is coupled to turn on the clamp switch for a first duration near an end of an off time of the power switch in response to the determination to turn on the power switch.

Example 13

The power converter of any one of examples 1 to 12, wherein the clamp control circuit receives the request signal and the clamp control circuit is configured to generate the clamp drive signal in response to the request signal.

Example 14

The power converter of any one of examples 1 to 13, wherein the regulation control circuit includes an enable circuit configured to generate an enable signal in response to the request signal and the clamp control circuit is configured to generate the clamp drive signal in response to the request signal.

Example 15

The power converter of any one of examples 1 to 14, wherein the regulation control circuit is further coupled to receive the clamp drive signal from the clamp control circuit, wherein the regulation control circuit further includes a delay circuit configured to output the primary drive signal in response to the clamp drive signal, wherein the delay circuit is configured to delay turn-on of the power switch a second duration after the first duration to provide sufficient time for a parasitic capacitance of the power switch to be discharged into the energy transfer element before the power switch is turned on.

Example 16

The power converter of any one of examples 1 to 15, wherein the regulation control circuit further includes a latch coupled between the clamp control circuit and the delay circuit, wherein the latch is configured to be set in response to the clamp drive signal from the active clamp circuit to generate the primary drive signal received by the delay circuit.

Example 17

The power converter of any one of examples 1 to 16, wherein the regulation control circuit is further coupled to receive a current sense signal representative of a switch current through the power switch, wherein the latch is coupled to be reset in response to the current sense signal that indicates that the switch current reaches a current limit to cause the primary drive signal to turn off the power switch.

Example 18

The power converter of any one of examples 1 to 17, wherein the regulation control circuit further includes a comparator coupled to receive a current sense signal and a current limit signal, wherein an output of the comparator is coupled to reset the latch.

Example 19

The power converter of any one of examples 1 to 18, wherein the clamp control circuit includes a monostable multivibrator configured to generate the clamp drive signal in response to the signal representative of the determination to turn on the power switch, wherein the monostable multivibrator is configured to output a pulse for the first duration in response to an edge in the signal representative of the determination to turn on the power switch.

What is claimed is:
1. A power converter, comprising:
an energy transfer element coupled between an input of the power converter and an output of the power converter;
a power switch coupled to the energy transfer element;
an active clamp circuit coupled to the energy transfer element and the power switch, the active clamp circuit comprising:
a capacitance,
a steering diode network coupled to the capacitance to transfer a charge to the capacitance;
a clamp switch coupled to the capacitance to transfer the charge stored in the capacitance to the energy transfer element;
an offset element coupled to the clamp switch to provide a path to discharge a capacitance associated with the clamp switch; and
a first controller coupled to the active clamp circuit and to the power switch, and configured to output a clamp drive signal to control the turn on and turn off of the clamp switch and to output a primary drive signal to control the turn on and turn off of the power switch, wherein the first controller is configured to turn on and turn off the clamp switch prior to the turn on of the power switch.

2. The power converter of claim 1, the steering diode network comprising:
a first diode coupled between the capacitance and the power switch, an anode of the first diode coupled to the power switch, and a cathode of the first diode coupled to the capacitance; and
a second diode coupled between the clamp switch and the power switch, an anode of the second diode coupled to the clamp switch, and a cathode of the second diode coupled to the power switch, wherein the first diode is coupled to transfer charge to the capacitance and the second diode is coupled to transfer charge from the capacitance to the energy transfer element.

3. The power converter of claim 2, wherein the charge transferred from the capacitance of the active clamp circuit, that is injected into a primary winding, is previously transferred at or near a beginning of an off time of the power switch through the first diode from a leakage inductance of the power converter.

4. The power converter of claim 3, wherein substantially no current is conducted through the clamp switch or the steering diode network after the charge from the leakage inductance has been transferred to the capacitance at or near the beginning of the off time of the power switch, and before the clamp switch is turned on near an end of the off time of the power switch to inject the charge stored in the capacitance into the primary winding.

5. The power converter of claim 1, wherein the offset element comprises a Zener diode.

6. The power converter of claim 5, wherein the steering diode network also comprises the Zener diode, an anode of the Zener diode is coupled to the clamp switch, and a cathode of the Zener diode is coupled to the power switch.

7. The power converter of claim 5, wherein the Zener diode is coupled in series with a third diode, an anode of the third diode is coupled to the power switch, and a cathode of the third diode is coupled to the offset element.

8. The power converter of claim 1, wherein the offset element comprises a resistance.

9. The power converter of claim 1, wherein the offset element comprises a capacitance.

10. The power converter of claim 9, wherein the capacitance of the offset element has a blocking voltage substantially equal to the product of a voltage across the clamp switch and the capacitance associated with the clamp switch divided by the sum of the capacitance associated with the clamp switch and the capacitance of the offset element.

11. The power converter of claim 9, wherein a stored charge of the capacitance associated with the clamp switch is transferred to the capacitance of the offset element.

12. The power converter of claim 1, wherein the clamp switch comprises a metal-oxide-semiconductor field-effect transistor.

13. The power converter of claim 1, wherein the clamp switch comprises a cascode switch, the cascode switch comprising:
a normally-on device coupled to the capacitance; and
a normally-off device coupled to the normally-on device, the normally-off device coupled to the offset element.

14. The power converter of claim 1, wherein the first controller comprises:
a regulation control circuit configured to generate the primary drive signal in response to a request signal including request events representative of a request to turn on the power switch to control a transfer of energy from the input of the power converter to the output of power converter; and
a clamp control circuit configured to generate a clamp drive signal in response to a signal representative of a determination to turn on the power switch, wherein the clamp drive signal is coupled to turn on the clamp switch for a first duration near an end of an off time of the power switch in response to the determination to turn on the power switch.

15. The power converter of claim 14, wherein the clamp control circuit receives the request signal and the clamp control circuit is configured to generate the clamp drive signal in response to the request signal.

16. The power converter of claim 14, wherein the regulation control circuit includes an enable circuit configured to generate an enable signal in response to the request signal and the clamp control circuit is further configured to generate the clamp drive signal in response to the request signal.

17. The power converter of claim 14, wherein the regulation control circuit is further coupled to receive the clamp drive signal from the clamp control circuit, wherein the regulation control circuit further includes a delay circuit configured to output the primary drive signal in response to the clamp drive signal, wherein the delay circuit is further configured to delay turn-on of the power switch a second duration after the first duration to provide sufficient time for a parasitic capacitance of the power switch to be discharged into the energy transfer element before the power switch is turned on.

18. The power converter of claim 17, wherein the regulation control circuit further includes a latch coupled between the clamp control circuit and the delay circuit, wherein the latch is coupled to be set in response to the clamp drive signal from the active clamp circuit to generate the primary drive signal received by the delay circuit.

19. The power converter of claim 18, wherein the regulation control circuit is further coupled to receive a current sense signal representative of a switch current through the power switch, wherein the latch is coupled to be reset in response to the current sense signal that indicates that the switch current reaches a current limit to cause the primary drive signal to turn off the power switch.

20. The power converter of claim 18, wherein the regulation control circuit further includes a comparator coupled to receive a current sense signal and a current limit signal, wherein an output of the comparator is coupled to reset the latch.

21. The power converter of claim 14, wherein the clamp control circuit includes a monostable multivibrator coupled to generate the clamp drive signal in response to the signal representative of the determination to turn on the power switch, wherein the monostable multivibrator is coupled to output a pulse for the first duration in response to an edge in the signal representative of the determination to turn on the power switch.

* * * * *